United States Patent [19]

Roy

[11] Patent Number: 4,641,233
[45] Date of Patent: Feb. 3, 1987

[54] AC TO DC CONVERTER WITH VOLTAGE REGULATION

[75] Inventor: Richard D. Roy, Schererville, Ind.

[73] Assignee: Eaton Corporation, Cleveland, Ohio

[21] Appl. No.: 730,009

[22] Filed: May 3, 1985

[51] Int. Cl.$^4$ ............................................. H02M 7/06
[52] U.S. Cl. ..................................... 363/89; 323/299; 363/79
[58] Field of Search ...................... 363/45, 80, 81, 89, 363/127, 79; 323/299, 300

[56] References Cited

U.S. PATENT DOCUMENTS

| | | | |
|---|---|---|---|
| 3,012,182 | 12/1961 | Ford | 363/127 |
| 3,697,856 | 10/1972 | Huang | 363/77 |
| 4,001,668 | 1/1977 | Lewis | 323/299 |
| 4,278,930 | 7/1981 | Rogers | 373/285 |

FOREIGN PATENT DOCUMENTS

| | | | |
|---|---|---|---|
| 3245238 | 6/1984 | Fed. Rep. of Germany | 363/127 |
| 3304759 | 8/1984 | Fed. Rep. of Germany | 363/89 |
| 22491 | 6/1972 | Japan | 363/127 |

OTHER PUBLICATIONS

Dudall, "Switching Regulator with No Choke", IBM Tech. Discl. Bul. vol. 26, No. 6, p. 2694.5, Nov. 1983.

Primary Examiner—William H. Beha, Jr.
Attorney, Agent, or Firm—C. H. Grace; R. A. Johnston

[57] ABSTRACT

An arrangement for converting AC input power to DC power at a reference voltage including an output filter capacitor which is connected to the input AC line when the output voltage is less than or equal to the desired reference voltage and when the input AC voltage is less than a predetermined threshold. In this manner, charging pulses are generated twice during each half cycle of rectified AC power.

3 Claims, 5 Drawing Figures

AC TO DC CONVERTER WITH VOLTAGE REGULATION

DESCRIPTION

Background of the Invention

This invention relates to an arrangement for supplying DC power from an AC source and, more particularly, to such an arrangement which has input and load regulation, high efficiency, low weight, small size and low cost.

Presently available DC power supplies can generally be classified into three different types. In the first type, the AC power is rectified and then reduced by a voltage divider. The voltage divider output is then filtered and regulated to the desired DC value. This approach is inefficient because the difference between the AC line voltage and the DC output voltage must be dropped by the voltage divider. As the output current is increased, the power dissipated in the voltage divider goes up by the square of the current. The large power dissipation makes this approach unsatisfactory in most applications.

The second type uses a stepdown transformer with a linear voltage regulator. This is the most traditional approach and is widely used. The stepdown transformer lowers the AC voltage to the working area of the output DC voltage. The low voltage AC is then rectified, filtered and regulated. The transformer is designed so that a low AC line condition coupled with a full output load current will still produce sufficient DC voltage for the regulator to operate. This approach suffers from two disadvantages. The first disadvantage is the physical size and weight of the stepdown transformer. The packaging requirements for the transformer lead to a large heavy unit. The second disadvantage is the low efficiency of the complete unit. The efficiency of small frame transformers is low. The variations in the AC line require that the nominal output be higher than the minimum which is needed. This results in high power dissipation in the regulator. Thus, the large size and low efficiency make this approach unsatisfactory.

The third type utilizes a switching power supply, which is the newest and fastest growing approach. The AC power is rectified and filtered, which produces high voltage DC. A high voltage solid state switch is pulsed at a high rate, on the order of 20 kilohertz. The output from the switch is filtered and reduced to the appropriate level by an L-C filter, the L-portion of the filter being a magnetic transformer with associated size and weight. The output voltage is compared to a reference by electronic circuitry which in turn controls the on time of the solid state switch by pulse width modulation techniques. The electronics enables the supply to compensate for both line and load variations. The rapid pulse rate provides response at the price of complexity. The complexity and costs of this approach make it unsatisfactory.

It is therefore an object of the present invention to provide a DC supply which does not possess the disadvantages discussed above.

SUMMARY OF THE INVENTION

The foregoing and additional objects are attained in accordance with the principles of this invention by providing an arrangement for converting AC input power to DC output power at a reference voltage comprising a capacitor, rectifying means for rectifying the AC input power, controllable switching means coupled between the output of the rectifying means and the capacitor for supplying current to charge the capacitor, first means responsive to the rectifying means output voltage being above a predetermined threshold for preventing the switching means from supplying the current, and second means responsive to the voltage across the capacitor being greater than the reference voltage for preventing the switching means from supplying the current.

BRIEF DESCRIPTION OF THE DRAWINGS

The foregoing will be more readily apparent upon reading the following description in conjunction with the drawings in which like elements in different figures thereof have the same reference character applied thereto and wherein.

DETAILED DESCRIPTION

Figure 1:
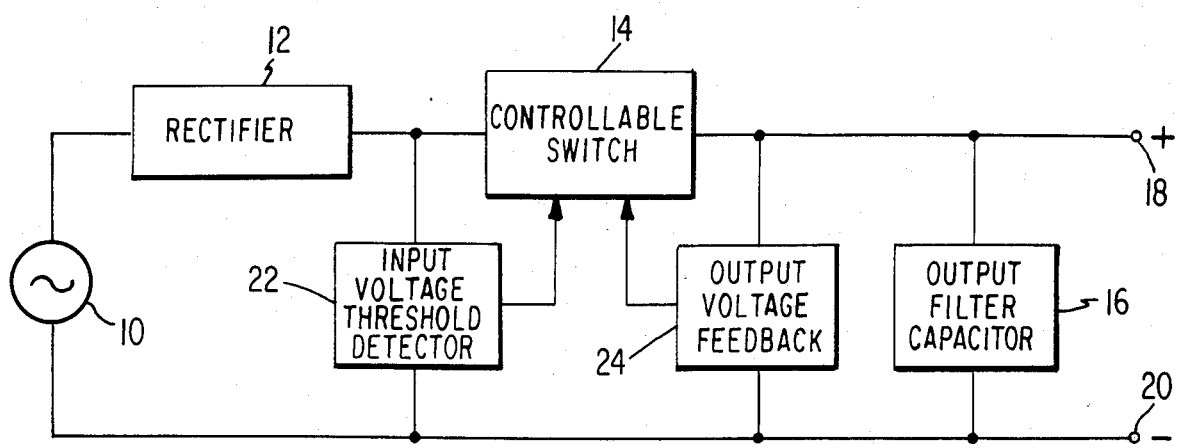
FIG. 1 is a general block diagram of an arrangement according to this invention.

Referring now to FIG. 1, the arrangement according to the present invention is connected to a source 10 of AC power and includes five operational sections. The rectifier 12 converts AC from the source 10 into rectified AC and may be either a half wave rectifier or a full wave rectifier. In any event, the rectifier 12 must block full line peak voltage and carry full charging current. The controllable switch 14 supplies current to the output filter capacitor 16 when the switch 14 is enabled and the input rectified voltage exceeds the output filter capacitor 16 voltage. The output filter capacitor 16 must be large enough to maintain the minimum acceptable voltage between charge pulses. Output terminals 18 and 20 are connected across the output filter capacitor 16. The input voltage threshold detector 22 provides an enabling signal to the controllable switch 14 when the rectified input voltage goes positive and before it substantially exceeds the desired output voltage. The output voltage feedback circuit 24 provides an enabling signal for the controllable switch 14 when the output voltage is less than the desired reference voltage.

Figure 2:
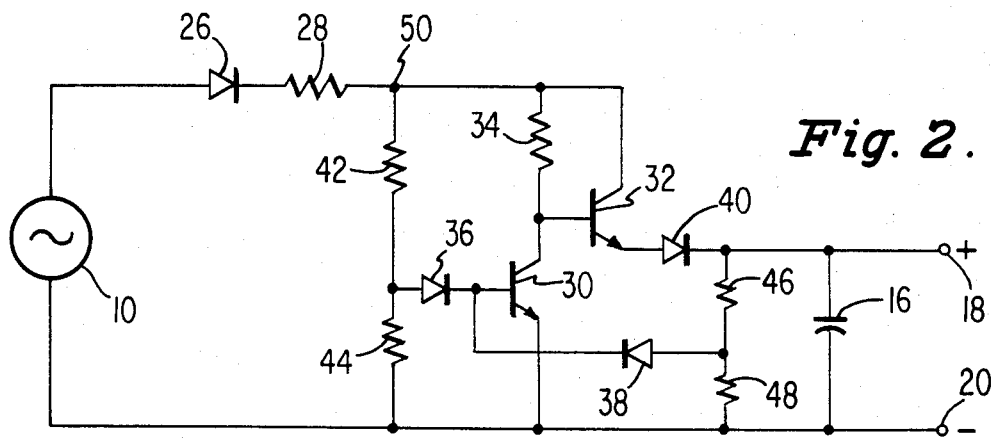
FIG. 2 is a detailed schematic circuit diagram of a first embodiment according to this invention.

FIG. 2 shows an embodiment of the present invention wherein the rectifier 12 is a half wave rectifier comprising the diode 26 and the resistor 28. The controllable switch includes the transistors 30 and 32, the resistor 34 and the diodes 36, 38 and 40. The input voltage threshold detector includes the resistors 42 and 44. The output voltage feedback circuit includes the resistors 46 and 48.

Figure 4:
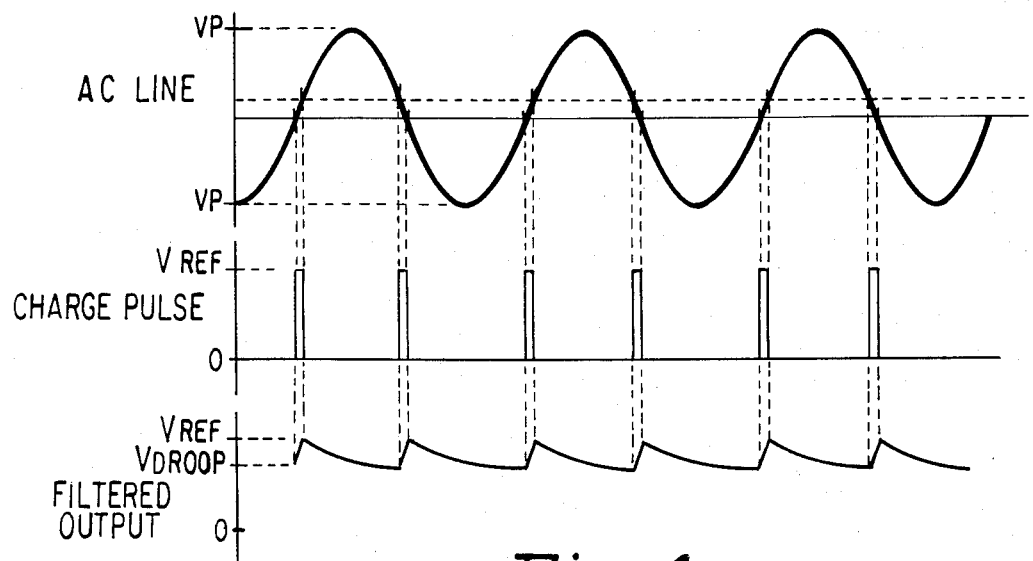
FIG. 4 shows waveforms useful in understanding this invention.

In operation, when the transistor 30 is turned ON, the transistor 32 is turned OFF, and vice versa. The resistors 42 and 44 act as a voltage divider and their values are selected such that, for a reference output voltage of five volts, the transistor 30 is turned ON when the voltage at the point 50 is greater than about twenty volts. This is to prevent damage to the components due to high voltage switching. The resistors 46 and 48 similarly act as a voltage divider and their values are selected so that the transistor 30 is turned ON when the voltage across the output capacitor 16 is greater than the desired reference voltage. The diodes 36 and 38 function as an OR circuit so that the transistor 30 is turned ON during either of the two aforementioned conditions. Therefore, the only time that the transistor 30 is OFF is when the voltage at the point 50 is less than about twenty volts and the voltage across the output filter capacitor 16 is less than the desired reference voltage. When this occurs, the transistor 32 is turned ON to provide a charging pulse through the diode 40 to charge the capacitor 16. This operation is illustrated by the waveforms shown in FIG. 4. It is seen from FIG. 4, that the output filter capacitor 16 can be charged two times during each positive half cycle of the input AC.

Figure 3:
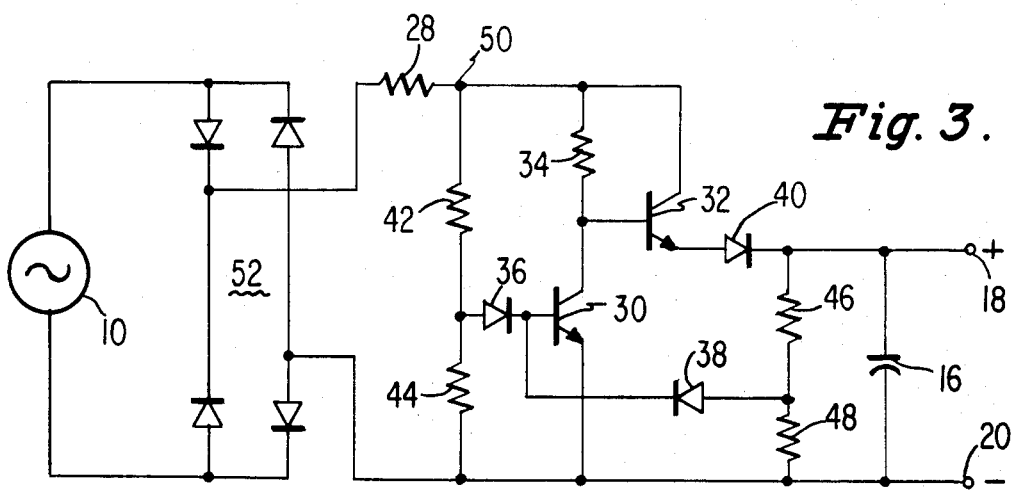
FIG. 3 is a detailed schematic circuit diagram of a second embodiment according to this invention.

FIG. 3 shows a circuit arrangement similar to that shown in FIG. 2 with the exception that a full wave diode bridge 52 replaces the half wave rectifier 26. With the circuitry shown in FIG. 3, the output filter capacitor can be charged two times in every half cycle of the input AC.

Figure 5:
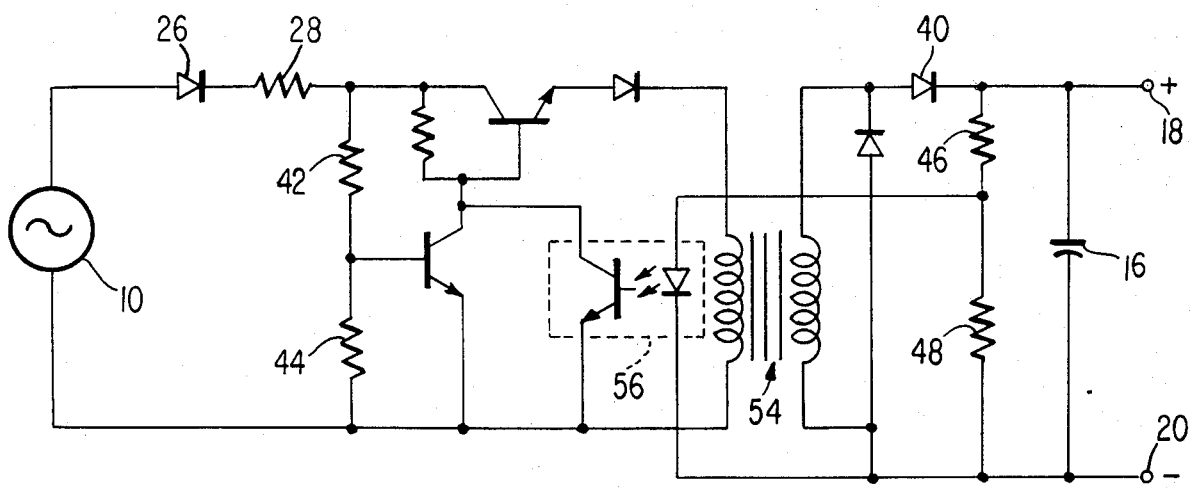
FIG. 5 is a detailed schematic circuit diagram of a third embodiment according to this invention.

FIG. 5 shows a further modification which may be utilized where it is desired to isolate the output from the input AC. In this case, an isolation transformer 54 is utilized and the output voltage feedback is coupled to the controllable switch by means of an opto-isolator 56. However, the use of an isolation transformer 54 and an opto-isolator 56 adds complexity, size and cost to the circuitry.

The aforedescribed arrangements possess a number of advantages. A converter constructed as above has small size and weight. This is because (other than the embodiment shown in FIG. 5) the circuits contain no magnetic components. The only high volume component is the output filter capacitor 16, and such a capacitor has a relatively low weight density. The circuitry described above is higly efficient because the bulk of the losses associated with the converter will be the charging current drop through two diodes and the solid state switch. These small losses produce only nominal temperature rises. The circuitry is of simple design with a low part count; a minimum design would require thirteen components (power switch, transistors, diodes, six resistors, a filter capacitor) of low complexity. The described circuitry operates within a wide input range. A properly designed supply would operate without modification from a wide range of AC line voltages and frequencies. For example, a single supply might operate both on 220 volt 50 hertz and 120 volt 60 hertz power lines. The supply is able to function properly with any AC input if the peak voltage is higher than the desired DC output voltage and the line frequency is less than the maximum switching speed of the power switch. It will also be appreciated that the output voltage level is independent of the AC line.

Modifications of the aforedescribed designs are also possible. For example, a single integrated circuit can duplicate the discrete design described herein. Also, the accuracy and stability of the output voltage can be improved by replacing the base-emitter junction of the transistor 30 with a precision voltage reference. Further, the polarity of the DC output voltage can be positive or negative and the supply can also be constructed in multiple stages of either polarity in combination.

Accordingly, there have been disclosed embodiments of an AC to DC converter. It is understood that the above-described embodiments are merely illustrative of the application of the principles of this invention. Numerous other embodiments may be devised by those skilled in the art without departing from the spirit and scope of this invention, as defined by the appended claims.

I claim:

1. An arrangement for converting AC input power to DC output power at a reference voltage, comprising:
   a capacitor;
   rectifying means for rectifying said AC input power;
   controllable switching means coupled between the output of said rectifying means and said capacitor for supplying current to charge said capacitor including a first transistor arranged with its collector and emitter in a current carrying path between said rectifying means and said capacitor and a second transistor coupled to the base of said first transistor;
   first means responsive to the rectifying means output voltage being above a predetermined threshold for preventing said switching means from supplying said current, including a first voltage divider connected across the output of said rectifying means and having first and second resistors connected in series, and first coupling means for coupling the junction of said first and second resistors in said first voltage divider to the base of said second transistor; and
   second means responsive to the voltage across said capacitor being greater than said reference voltage for preventing said switching means from supplying said current, including a second voltage divider connected across said capacitor and having third and fourth resistors connected in series, and second coupling means for coupling the junction of said third and fourth resistors in said second voltage divider to the base of said second transistor, and
   wherein said first and second coupling means together form an OR circuit consisting of a respective diode having its anode connected to the respective resistor junction and its cathode connected to said second transistor base.

2. The arrangement according to claim 1 wherein said rectifying means includes a half wave rectifier.

3. The arrangement according to claim 1 wherein said rectifying means includes a full wave rectifier.

* * * * *